United States Patent
Pathre (10) Patent No.: US 9,058,693 B2
(45) Date of Patent: Jun. 16, 2015

(54) LOCATION CORRECTION OF VIRTUAL OBJECTS

(71) Applicant: Dassault Systèmes DELMIA Corp., Auburn Hills, MI (US)

(72) Inventor: Uday Pathre, Troy, MI (US)

(73) Assignee: Dassault Systemes Americas Corp., Waltham, MA (US)

( * ) Notice: Subject to any disclaimer, the term of this patent is extended or adjusted under 35 U.S.C. 154(b) by 342 days.

(21) Appl. No.: 13/725,994

(22) Filed: Dec. 21, 2012

(65) Prior Publication Data

US 2014/0176530 A1   Jun. 26, 2014

(51) Int. Cl.
*G06T 19/20*   (2011.01)

(52) U.S. Cl.
CPC ......... *G06T 19/20* (2013.01); *G06T 2219/2016* (2013.01)

(58) Field of Classification Search
CPC ...................................................... G06T 19/20
USPC .................... 345/419; 348/94, 95; 382/151
See application file for complete search history.

(56) References Cited

U.S. PATENT DOCUMENTS

| 2005/0174361 A1* | 8/2005 | Kobayashi et al. | 345/633 |
| 2007/0018975 A1* | 1/2007 | Chuanggui et al. | 345/419 |
| 2007/0236514 A1* | 10/2007 | Agusanto et al. | 345/646 |
| 2008/0259073 A1* | 10/2008 | Lowe et al. | 345/419 |
| 2011/0190774 A1* | 8/2011 | Nikolchev et al. | 606/90 |
| 2013/0063560 A1* | 3/2013 | Roberts et al. | 348/46 |
| 2014/0118339 A1* | 5/2014 | Davies et al. | 345/419 |

OTHER PUBLICATIONS

Driels, M.R. and Pathre, U.S., "Significance of Observation Strategy on the Design of Robot Calibration Experiments," *J. of Robotic Systems*, 7(2): 197-223 (1990).
Driels, M.R. and Pathre, U.S., "Robot Calibration Using an Automatic Theodolite," *Int. J. Adv. Manuf. Technol.*, 9: 114-125 (1994).
Driels, M.R. and Pathre, U.S., "Robot Manipulator Kinematic Compensation Using a Generalized Jacobian Formulation," *J. of Robotic Systems*, 4(2): 259-280 (1987).

* cited by examiner

*Primary Examiner* — Maurice L McDowell, Jr.
(74) *Attorney, Agent, or Firm* — Hamilton, Brook, Smith & Reynolds, P.C.

(57) ABSTRACT

A computer-implemented method is provided for use in location correction of virtual objects in a virtual model of a real-world scene. Location of an object consists of both position and orientation of the virtual object. The method includes generating the virtual model, including a virtual object, and acquiring at least one digital image of a real-world object within the real-world scene, wherein the real-world object corresponds to the virtual object. The method also includes calculating an image-based positional difference between at least one predefined point on the virtual object and at least one corresponding point on the real-world object, adjusting the position and/or the orientation of the virtual object based on this image positional difference, and adjusting the virtual model with respect to the corrected location of the virtual object.

20 Claims, 11 Drawing Sheets

LOCATION CORRECTION OF VIRTUAL OBJECTS

BACKGROUND OF THE INVENTION

The embodiments described herein relate generally to graphical representations of real-world objects and/or scenes and, more particularly, to three-dimensional (3D) computer graphic modeling and simulation, and layout and location calibration of virtual objects that represent real-world objects. Location of an object consists of both position and orientation of the object.

Three-dimensional computer graphic simulations of manufacturing workcells are currently used for simulating manufacturing processes. The programs or simulation models are then downloaded to computers on the factory floor to drive the resources such as industrial robots. As part of this process, a virtual 3D model of the manufacturing workcell (including the machines, fixtures, and work pieces used in a manufacturing process) need to be adjusted for layout in the simulated workcell to match the actual position and orientations in the real workcell on the factory floor. This is enables the simulated manufacturing programs to validate the process for issues such as reachability and collisions. This also enables correct operation of the offline programs that will be downloaded to the manufacturing resources such as industrial robots in the factory.

Known methods of 3D location correction in the simulation model use expensive and complex measuring equipment such as coordinate measurement machines, theodolites, and/or laser range finders. However, such equipment needs to be set up in the factory. The measurement data taken from the factory is then imported into the 3D simulation and used to make the adjustments to the model. Accordingly, such known methods require that separate devices be purchased and users trained to use them. Moreover, such known methods require multiple steps at different locations.

SUMMARY OF THE INVENTION

In one aspect, a computer-implemented method is provided for use in location correction of a virtual model of a real-world scene. The method includes generating the virtual model, including a virtual object, and acquiring at least one digital image of a real-world object within the real-world scene, wherein the real-world object corresponds to the virtual object. The method also includes calculating an image-based positional difference between at least one predefined point on the virtual object and at least one corresponding point on the real-world object, adjusting the position and/or orientation of the virtual object based on the image positional difference, and adjusting the virtual model with respect to the corrected location of the virtual object.

In another aspect, a computer is provided for use in location correction of a virtual model of a real-world scene. The computer includes a memory area configured to store the virtual model and a virtual object within the virtual model. The computer also includes a processor coupled to the memory area. The processor is configured to generate the virtual model, including the virtual object, and acquire at least one digital image of a real-world object within the real-world scene, wherein the real-world object corresponds to the virtual object. The processor is also configured to calculate a image-based positional difference between at least one predefined point on the virtual object and at least one corresponding point on the real-world object, adjust the position and/or orientation of the virtual object based on the image positional difference, and adjust the virtual model with respect to the corrected location of the virtual object.

In another aspect, a computer program product includes one or more non-transitory computer-readable storage media having computer-executable components for use in location correction of a virtual model of a real-world scene. The components include a generation component that causes a processor to generate the virtual model, including a virtual object, and an acquisition component that causes the processor to acquire at least one digital image of a real-world object within the real-world scene, wherein the real-world object corresponds to the virtual object. The components also include a correction component that causes the processor to calculate an image-based positional difference between at least one predefined point on the virtual object and at least one corresponding point on the real-world object, adjust the position and/or orientation of the virtual object based on the image positional difference, and adjust the virtual model with respect to the corrected location of the virtual object.

DETAILED DESCRIPTION OF THE INVENTION

A description of example embodiments of the invention follows.

The teachings of all patents, published applications and references cited herein are incorporated by reference in their entirety.

Exemplary embodiments of computer-implemented methods, computer devices and systems, and computer program products for use in location correction of a virtual model of a real-world scene are described herein. The embodiments described herein facilitate 3D location correction for virtual objects in computer graphic models using, for example, a handheld tablet computer with a built-in digital camera, 3D graphical simulation or virtual reality software, and a method to achieve the desired spatial calibration. The embodiments described herein exploit the combination of high resolution photographic and computation capability built into such handheld tablet computers, along with the mathematically rigorous rendering of 3D model images from the software. The approach involves a type of "mediated reality," with the user capturing a small set of digital camera static images of the workcell superimposed on top of a 3D virtual image of the workcell model on the tablet computer. However, it should be understood that the embodiments described herein do not require superimposing an image over a virtual model. For example, the embodiments described herein also enable a computer device to display the image and the virtual modeling a side-by-side manner, for example, such that positional calculations and movements are tracked separately in each application. The computation approach detailed below then adjusts the 3D locations of the virtual objects in the virtual model to solve the calibration problem.

Moreover, the embodiments described herein facilitate ease of use, speed of the procedure, and a substantial reduction in cost and setup time for the measurement and equipment. In addition, the embodiments described herein contain an approach that eliminates the need for hardware-specific customization or length-standard type calibration of the digital camera built into the tablet computer during the 3D location adjustment. Furthermore, the embodiments described herein are scalable from small to large dimensions of the objects as well as fine to coarse accuracy of the adjustments as explained in detail below.

It should be understood that, although the embodiments described herein are explained in relation to industrial and/or manufacturing resources, the embodiments are not limited to such uses. For example, the embodiments may also be used during interior design for remodeling a room interior, wherein the 3D graphic model of the layout of existing objects such as furniture could be adjusted to correctly match the real layout inside the building room before commencing the redesign. Another example is architecture, wherein a 3D model of a set of buildings approximately located in the virtual model could be adjusted for actual positions by taking the tablet computer outdoors and capturing digital images of the buildings while walking around the grounds.

Figure 1:
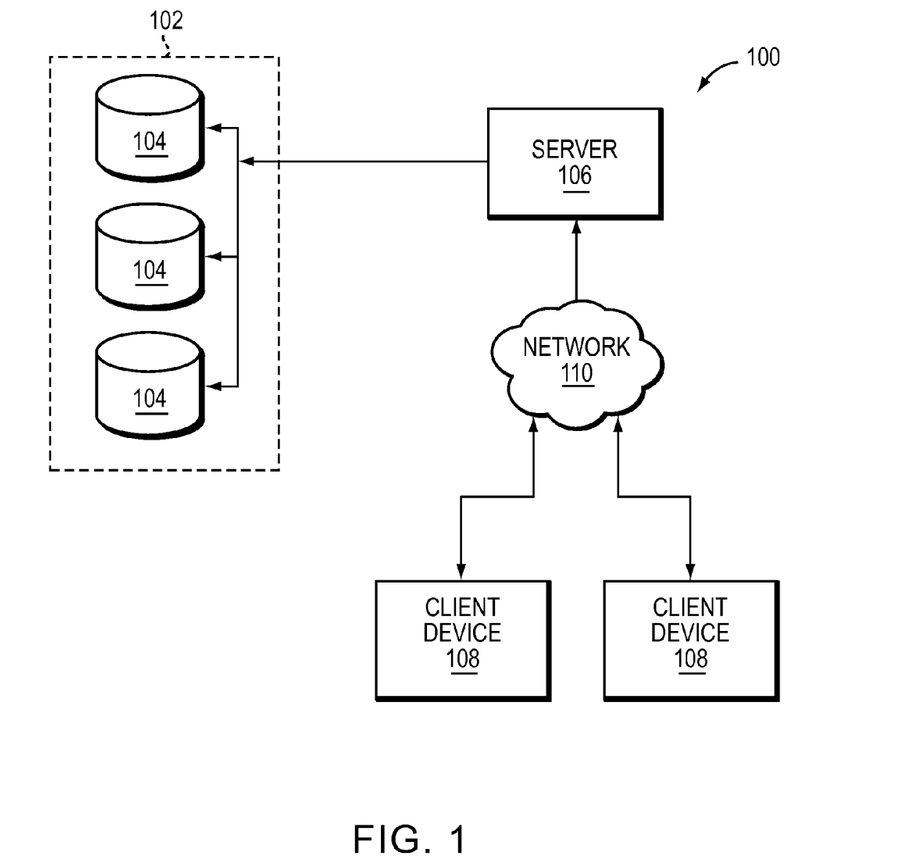
FIG. 1 is a schematic block diagram of an exemplary computer system for use in location correction of a virtual model of a real-world scene.

FIG. 1 is a schematic block diagram of an exemplary computer system 100 for use in location correction of a virtual model of a real-world scene, and/or for use in performing the processes described below and/or additional processes that may be related to those described below. In an exemplary embodiment, a memory area 102 includes one or more storage devices 104 for use in storing data, such as data related to simulations of real-world scenes. The storage devices 104 may be embodied as one or more databases and/or may be located at a single or at multiple geographical sites. In some embodiments, the memory area 102 is coupled to a server system 106. In an alternative embodiment, the memory area 102 is integrated with the server system 106. In an exemplary embodiment, the server system 106 is coupled to one or more client devices 108 via a network 110. Client devices 108 may include mobile client devices including, but not limited to only including, laptop computers, tablet computers, and/or smartphones. Moreover, client devices 108 may include stationary client devices that are generally not mobile, such as desktop computers and the like.

As can be appreciated, the network 110 can be a public network, such as the Internet, or a private network such as an LAN or WAN network, or any combination thereof and can also include PSTN or ISDN sub-networks. The network 110 can also be wired, such as an Ethernet network, or can be wireless such as a cellular network including EDGE, 3G, and 4G or LTE wireless cellular systems. The wireless network can also be WiFi, Bluetooth, or any other wireless form of communication that is known. Thus, the network 110 is merely exemplary and in no way limits the scope of the present advancements.

The server system 106 and/or the client devices 108 can be any suitable computer architecture such as the one described below with reference to FIG. 5, or any other computing architecture that is known. Moreover, it should be understood that the server system 106 is configured to perform the processes described above and/or any additional processes that may be related to those described above.

In some embodiments, the server system 106 can also provide data from the memory area 108 as needed to the client devices 108 such that the client devices 108 execute the processes described above. As such, FIG. 1 includes implementations of the computer system 100 via cloud computing, distributed computing, and the like. Moreover, in some embodiments, the server system 106 stores computer-readable instructions to execute the processes described below, and provides these instructions via the network 110 to the client devices 108. Such computer-readable instructions may be embodied as a computer program product having one or more non-transitory computer-readable storage media with computer-executable components for use in location correction of a virtual model of a real-world scene. As described in additional detail below, the components include a generation component that causes a processor to generate the virtual model, including a virtual object, and an acquisition component that causes the processor to acquire at least one digital image of a real-world object within the real-world scene, wherein the real-world object corresponds to the virtual object. The components also include a correction component that causes the processor to calculate an image positional difference between at least one predefined point on the virtual object and at least one corresponding point on the real-world object, adjust the position and/or the orientation of the virtual object based on the image positional difference, and adjust the virtual model with respect to the corrected location of the virtual object.

Figure 2:
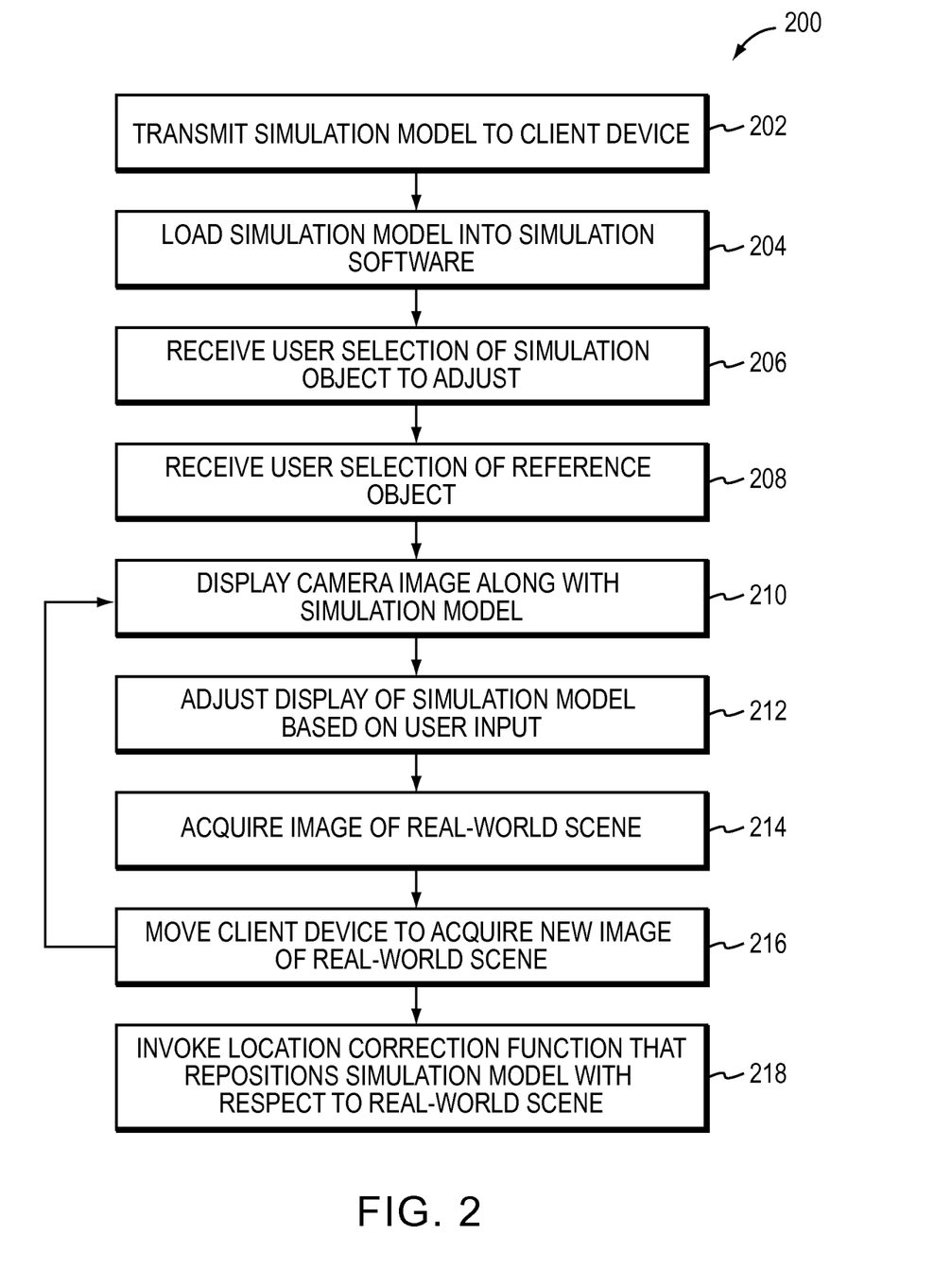
FIG. 2 is a flowchart that illustrates operation of the computer system shown in FIG. 1.

FIG. 2 is a flowchart 200 that illustrates operation of the computer system 100 shown in FIG. 1. In an exemplary embodiment, and referring to both FIG. 1 and FIG. 2, the server system 106 transmits 202 a virtual model, such as a 3D model for use in a simulation or virtual display of the real-world scene, of the real-world scene or workcell to a client device 108 via the network 110. The client device 108 loads 204 the virtual model into a simulation or virtual reality software module and receives 206 from a user selection of one or more virtual objects whose spatial locations the user wishes to adjust. The client device 108 also receives 208 from the user selection of a reference object or reference point within the virtual model. The client device 108 then displays 210 the digital camera image superimposed on the virtual 3D view or in a side-by-side manner with the virtual 3D view. The 3D view in the client device 108 is then adjusted 212 based on additional user input, by virtual rotations and translations, the display of the virtual model to a desired viewpoint in terms of zoom and orientation, so as to approximately match the 3D view to the superimposed camera image. A digital image along with the corresponding 3D virtual view is then acquired 214 by the client device 108 and saved to the client device 108 and/or the server 106.

In an exemplary embodiment, the user then holds the client device 108 in the real-world scene, such as a room layout, factory floor, or building grounds, and moves about 216 with the client device 108 so as to get a different perspective in the display of the digital camera image along with the virtual model 210. In an exemplary embodiment, the user repeatedly adjusts 212 the display of the virtual 3D view and captures a new digital image along with its 3D view each time 214. The client device 108 and/or the server system 106 then invokes 218 a location correction functionality that uses the captured digital image(s) to identify the position and orientation of the virtual object compared to the real-world object to which it corresponds, as detailed below in flowchart 300. The client device 108 and/or the server system 106 completes the location correction function, which results in improved accuracy of location and orientation of the virtual object in the virtual model with respect to the real-world object in the real-world scene. A resulting manufacturing simulation or virtual display will be enhanced such that spatial and/or temporal errors will be reduced. In some embodiments, the client device 108 transmits properties of the virtual object and/or virtual model, such as the new position and/or orientation of the virtual object, to the server system 106 for storage in memory area 102. In such embodiments, the stored data can be accessed later for subsequent simulations.

Figure 3:
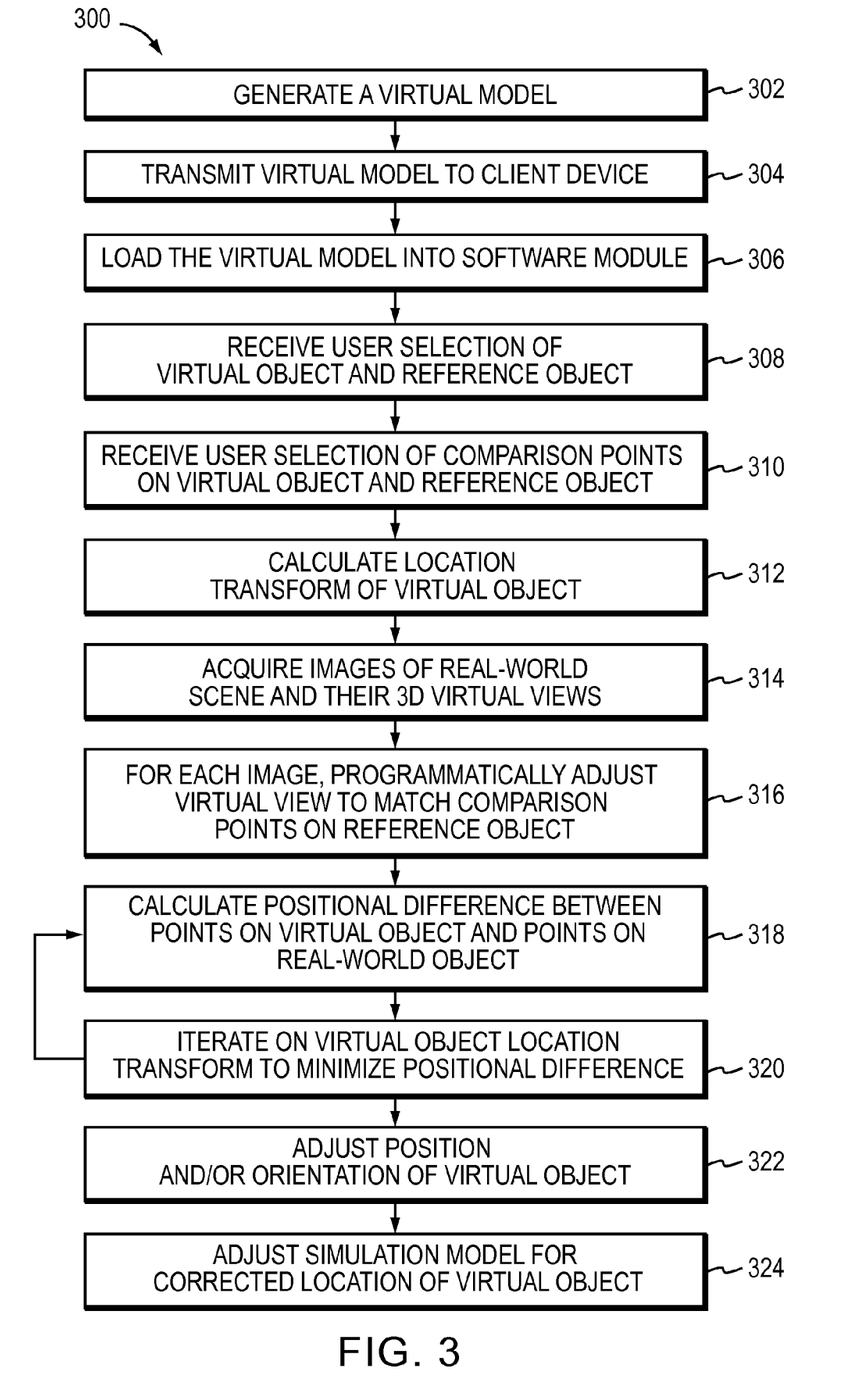
FIG. 3 is a flowchart that further illustrates operation of the computer system shown in FIG. 1.
Figure 4A:
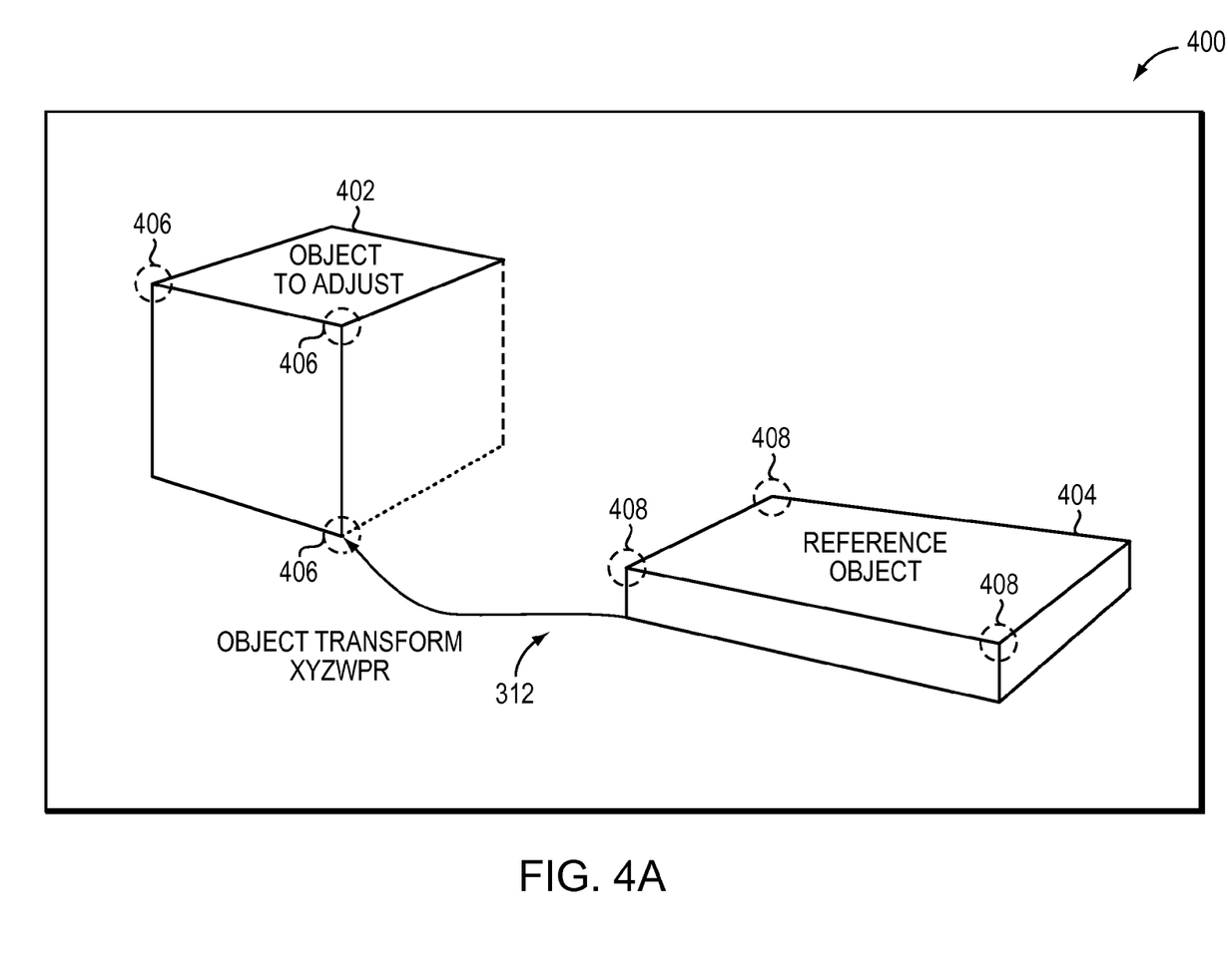
FIGS. 4A-4G are illustrations of an exemplary display of a client device used in the computer system shown in FIG. 1.

FIG. 3 is a flowchart 300 that further illustrates operation of the computer system 100 shown in FIG. 1. In an exemplary embodiment, and referring to both FIG. 1 and FIG. 3, the server system 106 generates 302 a virtual model that represents a real-world scene. The server system 106 transmits 304 the virtual model to a client device 108 via the network 110. The client device 108 loads 306 the virtual model into a simulation or virtual reality software module. In an exemplary embodiment, the client device 108 receives 308 user inputs to identify a virtual object and a reference object in the virtual model. The virtual object is one on which the user wishes to perform the location correction steps described herein. The reference object is one relative to which the location correction is completed. For example, FIG. 4A is an illustration of an exemplary display 400 of client device 108. The client device 108 displays a virtual object 402 and a reference object 404.

Figure 4B:
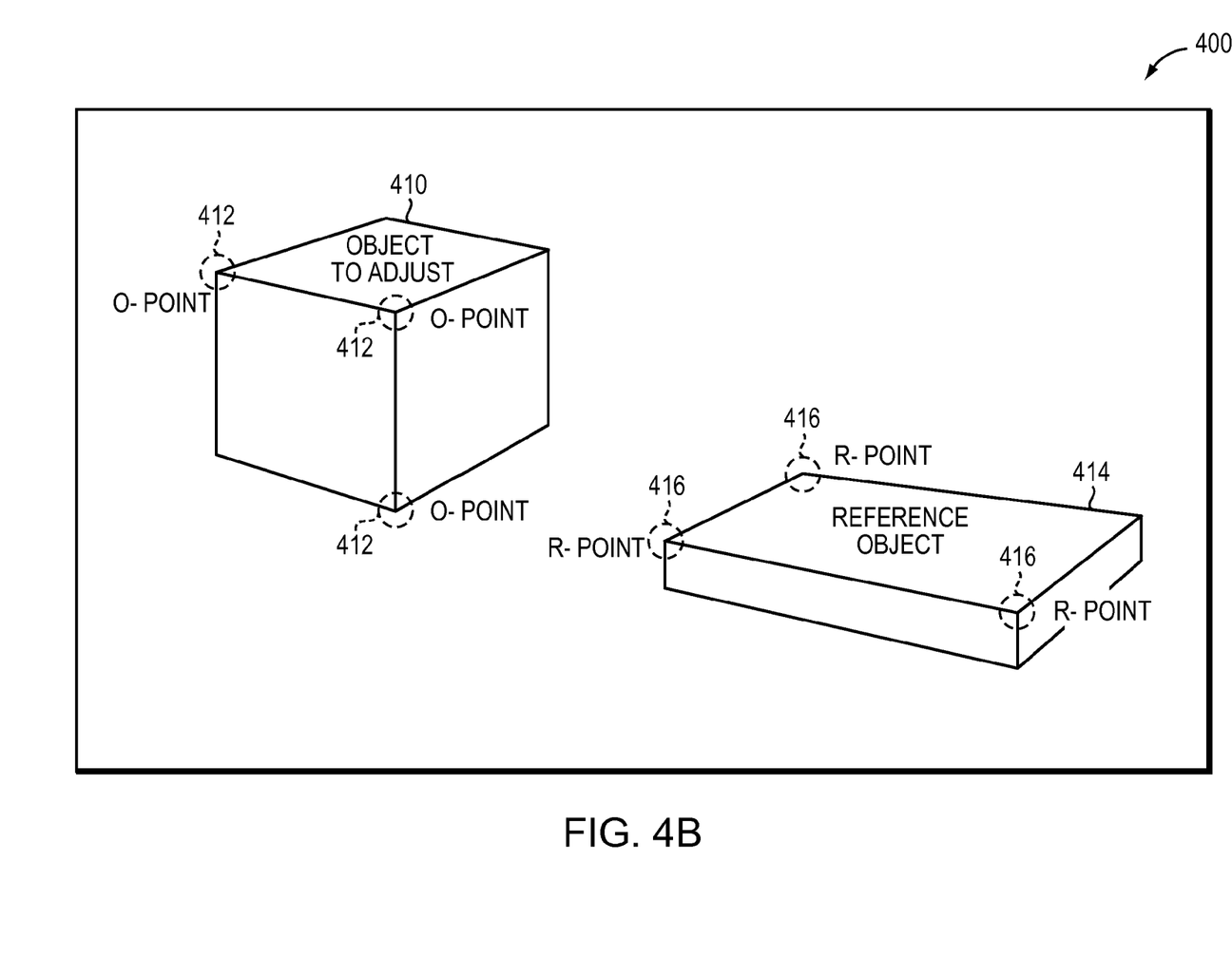

In some embodiments, the client device 108 also receives 310 user inputs to identify one or more predefined comparison features on the virtual object 402 and one or more corresponding comparison features on the reference object 404. In an alternative embodiment, vision processing and/or pattern recognition algorithms may be used to identify the predefined features on the virtual object 402 and the reference object 404. As shown in FIG. 4A, the 3D view of the virtual object 402 has three predefined features in the form of vertex points 406 and the reference object 404 has three corresponding predefined features in the form of vertex points 408. FIG. 4B is another illustration of display 400 of the client device 108 showing a digital image from the camera built-in to the client device. As shown in FIG. 4B, the real-world object 410 has three points 412 that correspond to the user-selected points 406 on the virtual object 402. The real-world reference object 414 has three points 416 that correspond to the user-selected points 408 on the virtual reference object 404. Although FIGS. 4A and 4B show the virtual object 402, virtual reference object 404, real-world object 410, and real-world reference object 414 as cubical objects, it will be understand that the embodiments described herein are not limited to use with cubical objects. Rather, the embodiments described herein may be used with objects of any shape that allows for selection of some identifiable set of points. Moreover, the predefined comparison features 406, 408, 412, and/or 416 may be vertices, as shown in FIGS. 4A and 4B, or may be lines, planes, or surfaces. In some embodiments, the client device 108 transmits data related to the identified points 406, 408, 412, and/or 416, such as coordinates of the identified points, to the server system 106.

After the predefined points 406 and/or 408 are identified, the client device 108 calculates 312 a location transform based on the identified points 406 and/or 408. In the virtual model, the position and orientation of each virtual object is defined by six parameters (X, Y, Z, W, P, and R). The first three parameters (X, Y, Z) are distances that fix the position of the virtual object in an x-direction, a y-direction, and a z-direction. The second three parameters (W, P, R) are angles that fix the orientation of the virtual object, where W represents the yaw, P represents the pitch, and R represents the roll. Together, these six parameters can be called the location transform of the virtual object. Moreover, the location transform of a virtual object 402 is calculated with respect to a reference coordinate system, such as that implied by the virtual reference object 404. Specifically, the location transform of the virtual object 402 is calculated based on the position (X, Y, Z) of the identified points 406 on the virtual object 402 and the identified points 408 on the reference object 404. As shown in FIG. 4A, the points 406 on the virtual object 402 are those used to calculate the location transform 312. In an exemplary embodiment, the reference object 404 provides both the reference coordinate system and a dimensional length standard for the location correction to be completed. Hence, the 3D model of the reference object 404 approximately matches a real-world reference object (not shown) in terms of the location of its identified points 408. In other words, the respective distances between the identified points 408 of the virtual reference object 404 and the corresponding points of the real-world reference object should be identical within an application dependant predefined tolerance.

Figure 4C:
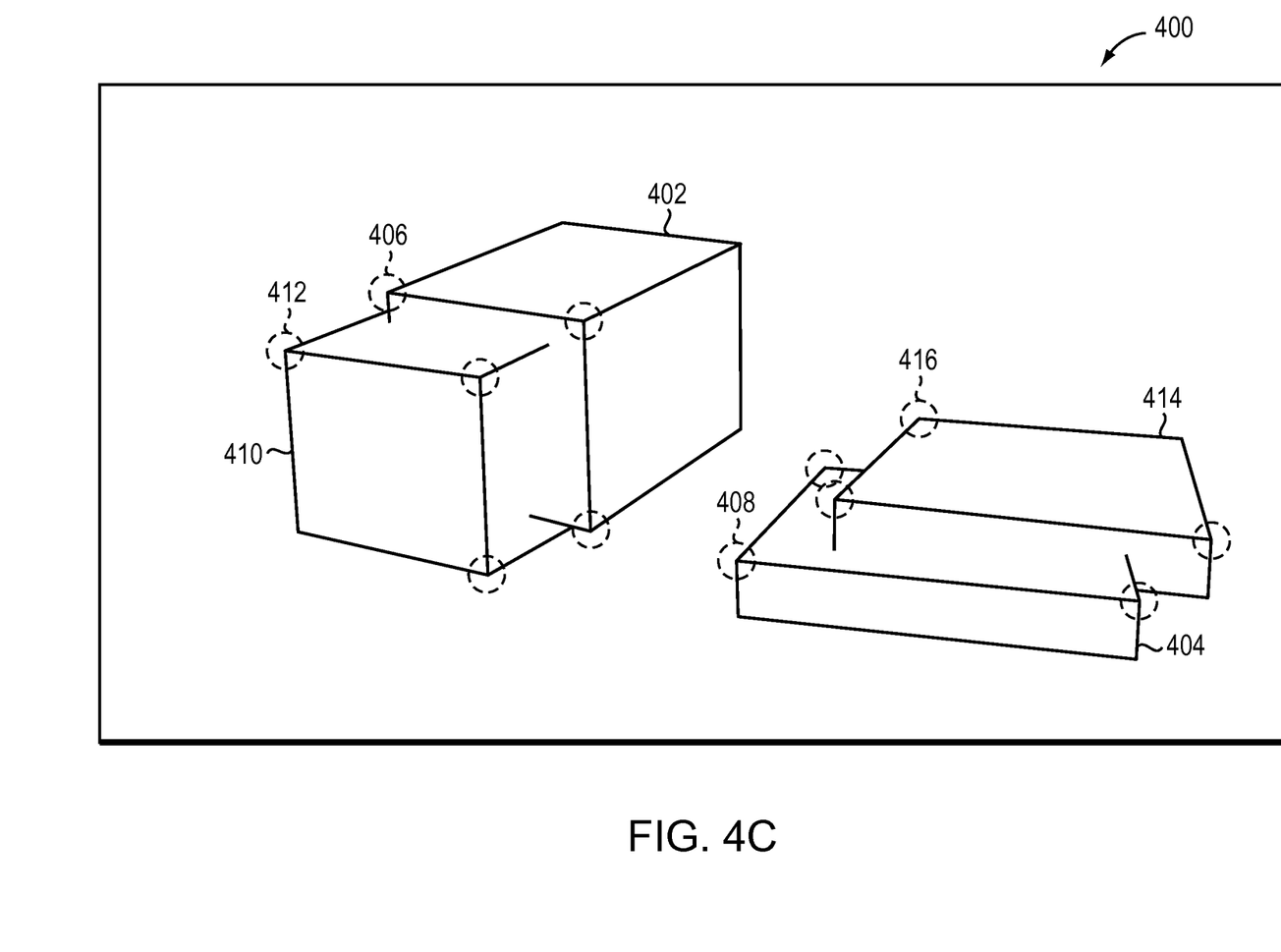
Figure 4D:
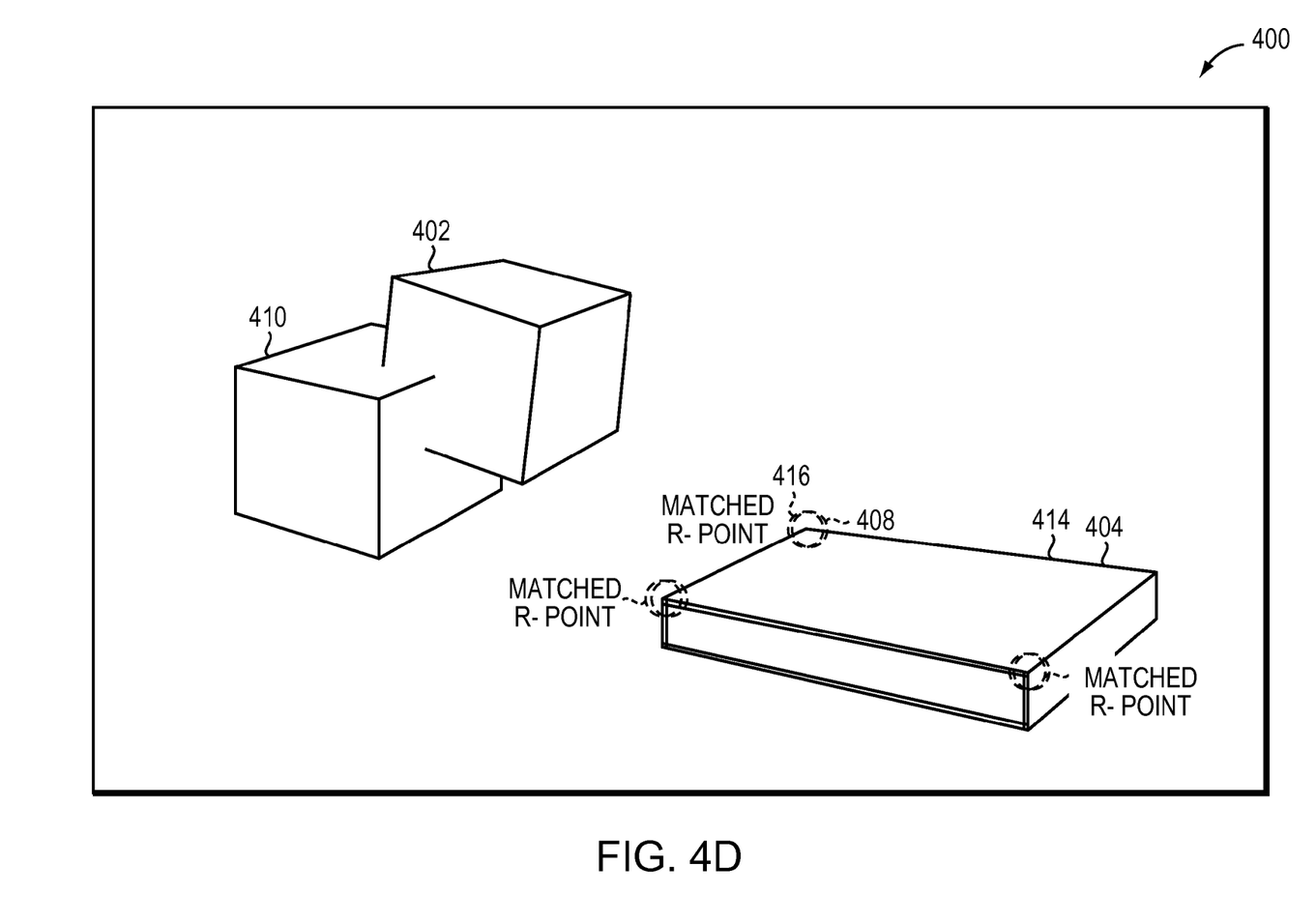

After the location transform is calculated, the camera device in the client device 108 acquires 314 digital images of the real world scenes along with their 3D virtual views as explained 210 to 214 in FIG. 2. Moreover, and referring again to FIG. 2, the client device 108 receives 212 user inputs in the form of manipulations of the virtual reference object 404. For example, the user may use a touch screen to reposition, such as using rotate, translate, and/or zoom operations, such that the virtual object 402 and the reference object 404 is approximately aligned with the real-world object 410 and the reference object 414. FIGS. 4C and 4D are additional illustrations of display 400 of the client device 108. Specifically, FIG. 4C illustrates the client device 108 displaying the virtual model overlaid or simultaneously with the real-world scene, including the virtual object 402 and its corresponding real-world object 410, as well as the reference object 404 and its corresponding real-world reference object 414. The situation depicted in FIG. 4C results after the user adjusts 212 the 3D virtual view to approximately align the real-world image. The client device 108 and/or the server 106 then launches a programmatic adjustment 316 of the 3D virtual view by means of fine modifications of the viewing rotation, translation and/or zoom so as to approximately match the predefined points 408 on the reference object 404 with the points 416 on the real world reference object 414. This programmatic view adjustment is done for each of the images acquired 314 from different perspectives of the real-world scene. FIG. 4D shows the resulting situation after step 316 such that the virtual reference object 404 matched up with the real-world reference object 414. Specifically, the points 408 of the reference object 404 are substantially aligned with corresponding points 416 of the real-world reference object 414. Furthermore, it is this programmatic adjustment 316 which eliminates the need for any hardware specific camera calibration and ensures that the length standard implied by the dimensions of the reference object 404 is automatically accounted for in the following location correction.

Figure 4E:
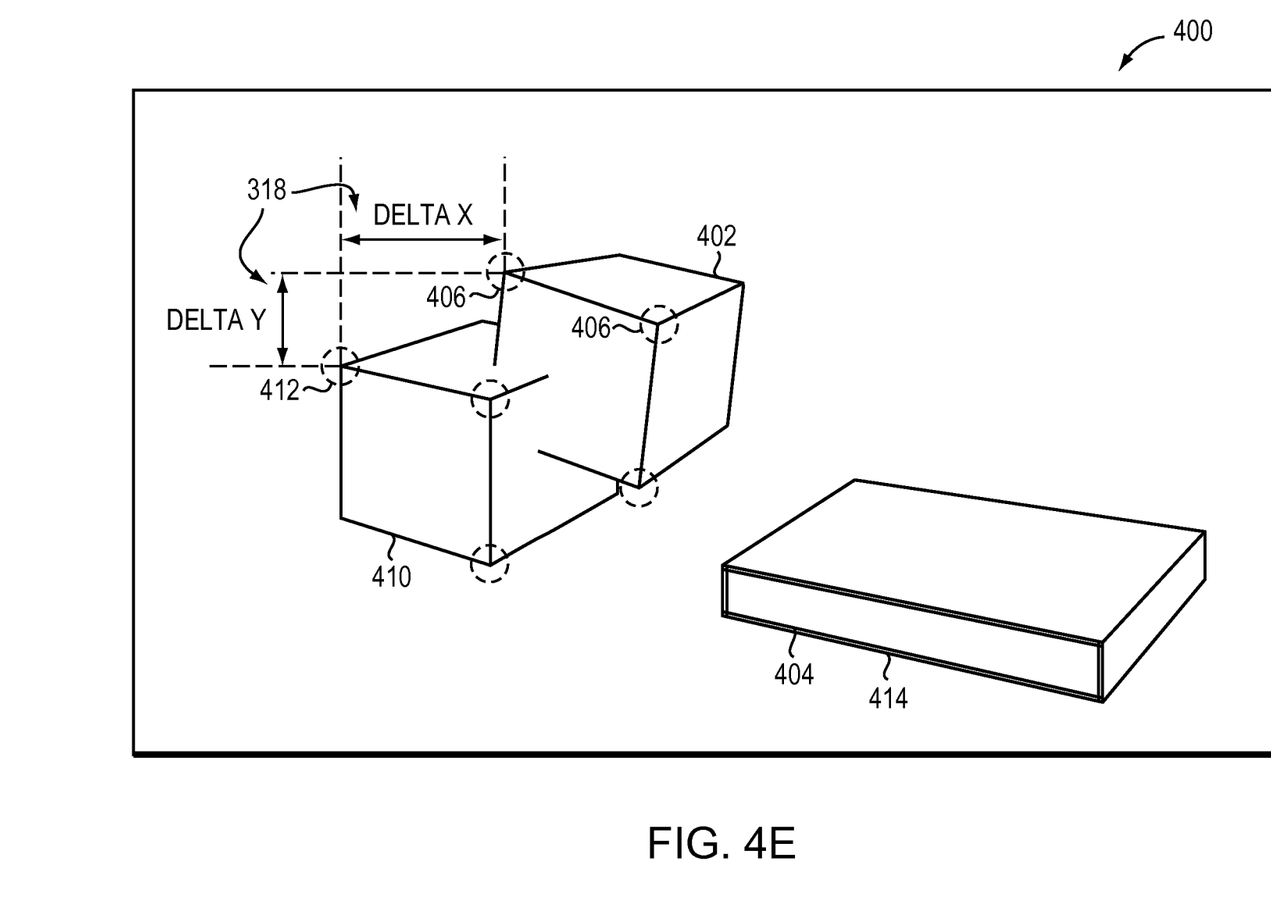

When the reference object 404 is substantially aligned by programmatic adjustment 316 with the real-world reference object 414, the client device 108 and/or the server system 106 now determines the mismatch between the virtual object points 406 and the corresponding points 412 on the real-world object 410. Specifically, the client device 108 and/or the server system 106 calculates 318 an image-based positional difference between the points 406 on the virtual object 402 and the corresponding points 412 on the real-world object 410. In an exemplary embodiment, the difference is calculated in pixels in each of the X and Y directions. FIG. 4E is another illustration of display 400 of the client device 108.

Figure 4F:
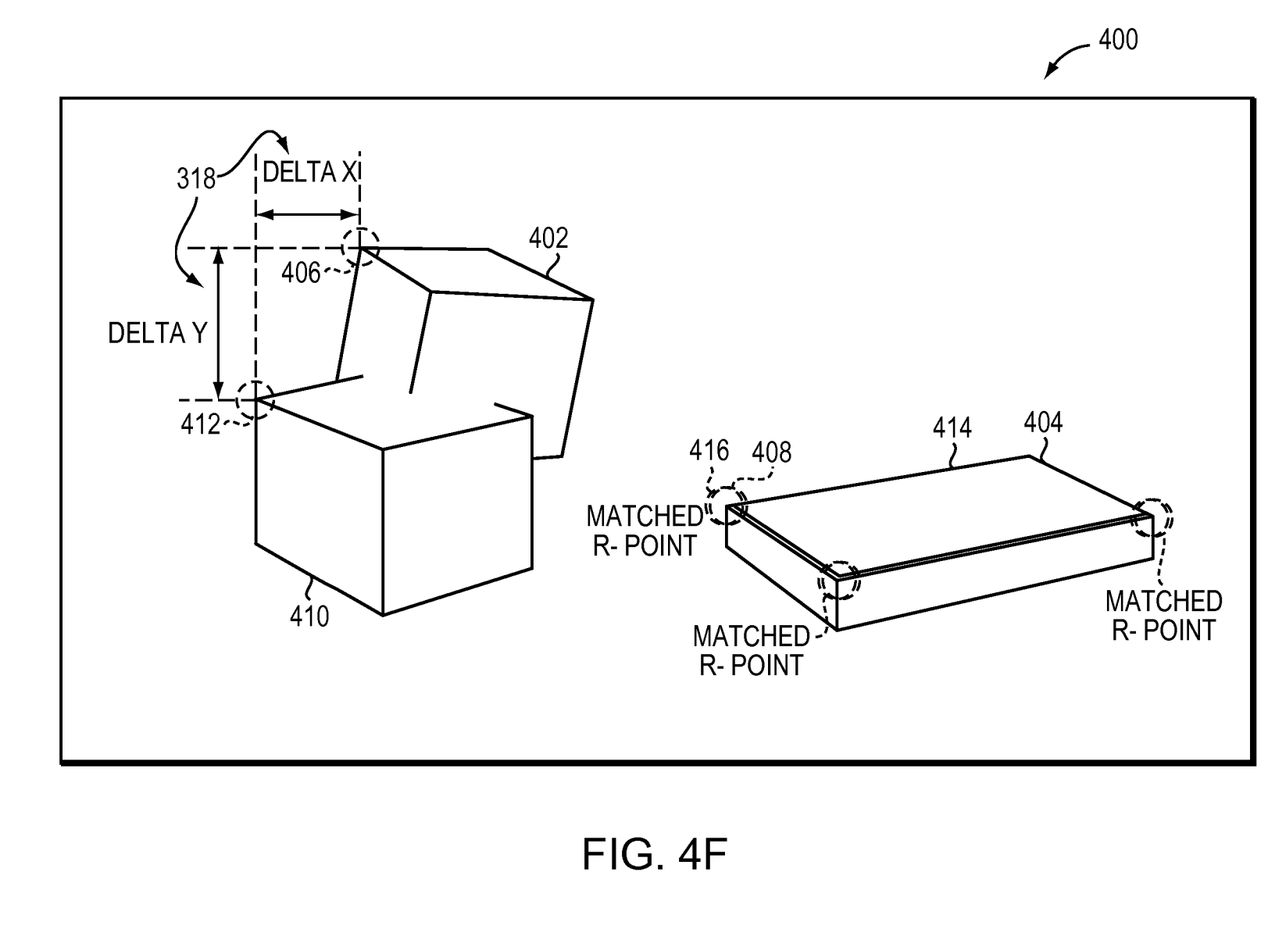

Specifically, FIG. 4E shows the distance in each of the X-direction (DeltaX) and in the Y-direction (DeltaY) for one of the points 406 of the virtual object 402 and a corresponding point 412 of the real-world object 410. In an exemplary embodiment, however, the client device 108 and/or the server system 106 calculates 318 the difference for all pairs of identified points 406 and 412. In an exemplary embodiment, the differences are stored in memory area 102. The client device 108 and/or the server system 106 calculates this image positional difference for each of the images acquired 314 from different perspectives of the real-world scene. FIG. 4F is another illustration of a display of the client device 108. Specifically, FIG. 4F shows the image positional difference calculation for another capture from an alternate perspective of the real-world scene, after the reference object 404 has been substantially re-aligned with the real-world reference object 414.

Figure 4G:
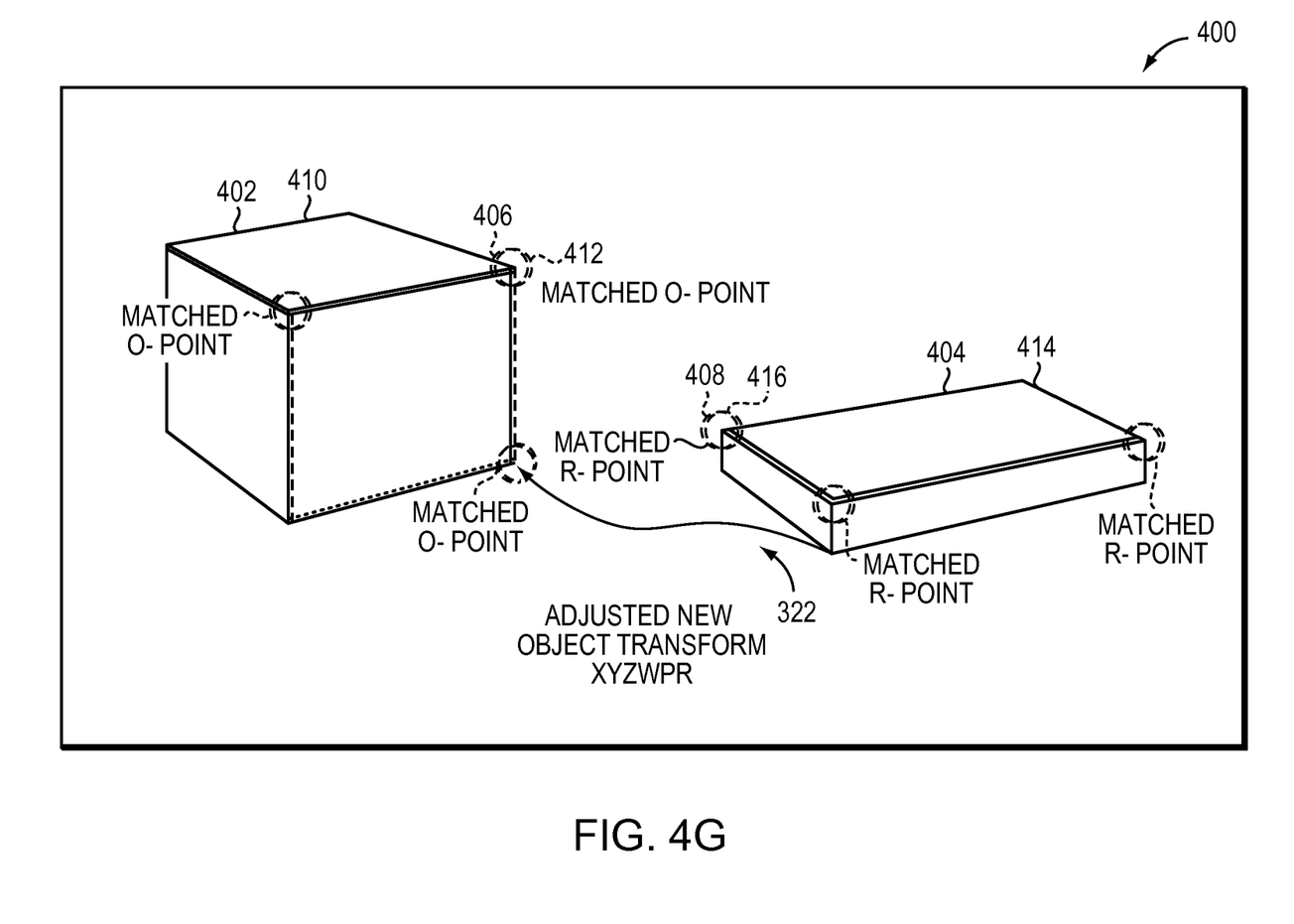

The client device 108 and/or the server system 106 then iterates 320 on the location transform of the virtual object 402 so as to minimize the combination of all the image positional differences between the virtual object 402 and the real-world object 410. In one embodiment, the client device 108 and/or the server system 106 uses standard non-linear regression that minimizes a cost function by adjusting a set of variable parameters. In an exemplary embodiment, the cost function is a summation of the root-mean-square (RMS) error for all of the calculated DeltaX and DeltaY differences. The variable parameters would be the (X, Y, Z, W, P, and R) values of the virtual object 402, i.e., the calculated location transform of the virtual object 402. Based on the results of this minimization step 320, the client device 108 and/or the server system 106 adjusts 322 the position and/or the orientation of the virtual object 402 and adjusts 324 the virtual model with respect to the corrected location of the virtual object 402. FIG. 4G is another illustration of the display of the client device 108. Specifically, FIG. 4G shows the end result regarding the reorientation and/or repositioning of the virtual object 402 and the virtual model as a whole.

It should be understood that although the steps above describe adjusting a virtual model based only on adjusting the position of a single virtual object, the embodiments described herein contemplate adjusting the positions of multiple virtual objects, one or more at a time. In an exemplary embodiment, each virtual model adjustment uses the same reference object. However, in some embodiments, the reference object may be different for different virtual objects and/or may simply be reference points in space rather than objects.

Figure 5:
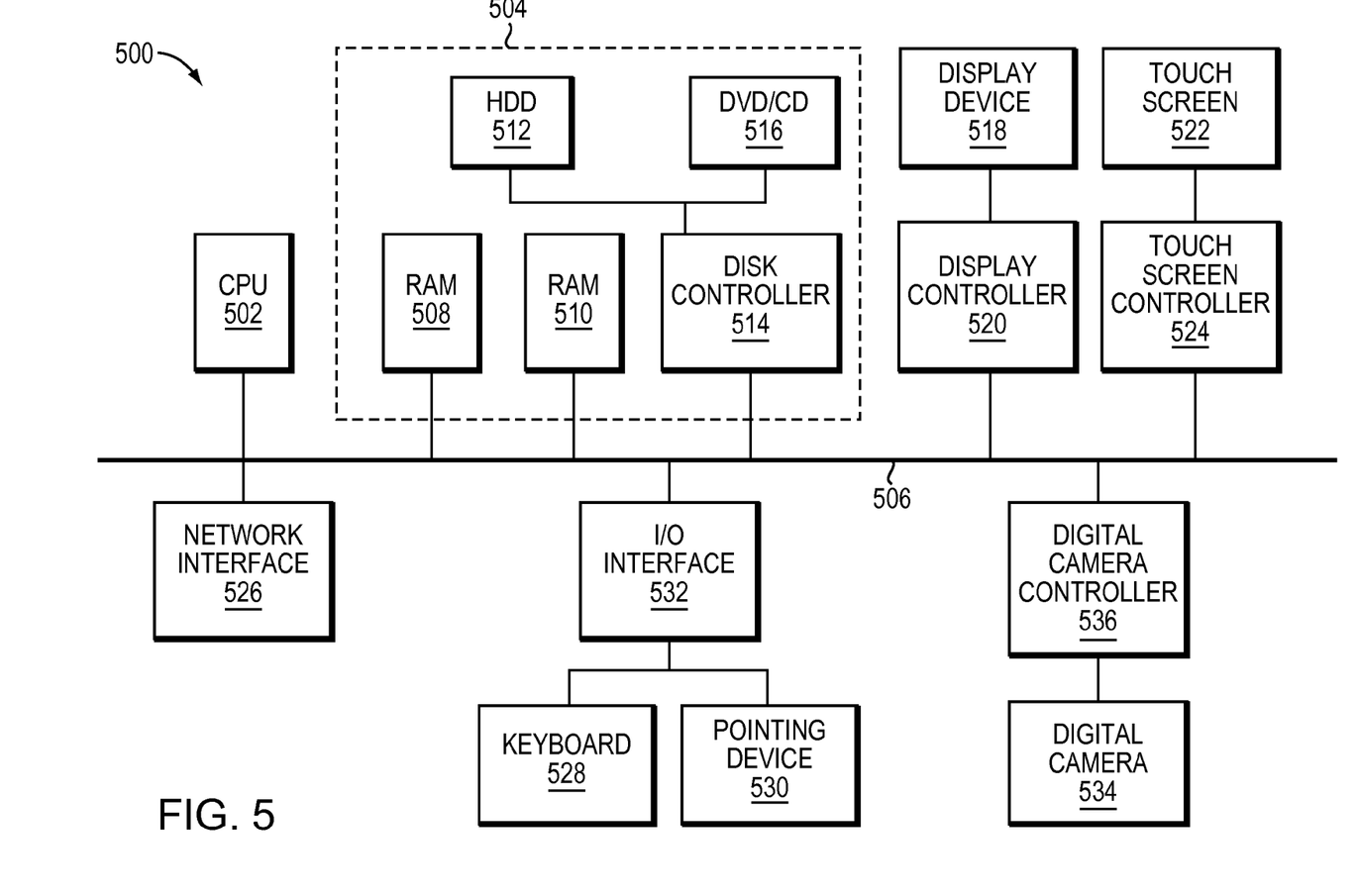
FIG. 5 is a schematic block diagram of an exemplary computer architecture for use with the server system and/or the client devices shown in FIG. 1.

FIG. 5 is a schematic block diagram of an exemplary computer architecture 500 for use with the server system 106 and/or the client devices 108 (each shown in FIG. 1).

In an exemplary embodiment, the computer architecture 500 includes one or more processors 502 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 504 that is operably and/or communicatively coupled to the processor 502 by a system bus 506. A "memory area," as used herein, refers generally to any means of storing non-transitory program code and instructions executable by one or more processors to aid in location correction of a virtual model of a real-world scene, and/or for use in performing the processes described above and/or additional processes that may be related to those described above. The memory area 504 may include one, or more than one, forms of memory. For example, the memory area 504 may include random-access memory (RAM) 508, which can include non-volatile RAM, magnetic RAM, ferroelectric RAM, and/or other forms of RAM. The memory area 504 may also include read-only memory (ROM) 510 and/or flash memory and/or electrically-programmable read-only memory (EEPROM). Any other suitable magnetic, optical, and/or semiconductor memory, such as a hard-disk drive (HDD) 512, by itself or in combination with other forms of memory, may be included in the memory area 504. The HDD 512 may also be coupled to a disk controller 514 for use in transmitting and receiving messages to and from the processor 502. Moreover, the memory area 504 may also be, or may include, a detachable or removable memory 516, such as a suitable cartridge disk, CD-ROM, DVD, or USB memory. The above examples are exemplary only and, thus, are not intended to limit in any way the definition and/or meaning of the term "memory area."

The computer architecture 500 also includes a display device 518 that is coupled, such as operatively coupled, to a display controller 520. The display controller 520 receives data via the system bus 506 for display by the display device 518. The display device 518 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 518 may include a touchscreen 522 with an associated touchscreen controller 524. The above examples are exemplary only and, thus, are not intended to limit in any way the definition and/or meaning of the term "display device."

In addition, the computer architecture 500 includes a network interface 526 for use in communicating with a network (not shown in FIG. 5). Moreover, the computer architecture 500 includes one or more input devices, such as a keyboard 528 and/or a pointing device 530, such as a roller ball, mouse, touchpad, and the like. The touchscreen 522 and its controller 524 may also be thought of as integrated keyboard 528 and/or pointing device 530. The input devices are coupled to and controlled by an input/output (I/O) interface 532, which is further coupled to the system bus 506. The computer architecture 500 also includes at least one digital camera 534 with its associated digital camera controller 536.

A description of the general features and functionality of the display device 518, keyboard 528, pointing device 530, as well as the display controller 520, disk controller 514, network interface 526, and I/O interface 532 is omitted herein for brevity as these features are known.

During operation, and referring to FIGS. 2-5, the processor 502 generates a virtual model that represents a real-world scene and loads the virtual model into a simulation or virtual reality software module. In an exemplary embodiment, the processor 502 receives user inputs via the touchscreen 522, for example, to identify a virtual object and a reference object in the virtual model. The virtual object is one on which the user wishes to perform the location correction steps described herein. The reference object is one against which the location correction is completed.

In some embodiments, the processor 502 also receives user inputs to identify one or more predefined points on the virtual object and one or more corresponding points on the reference object. After the predefined points are identified, the processor 502 calculates a location transform based on the identified points. Moreover, the location transform of a virtual object is calculated with respect to a reference point, such as the reference object. After the location transform is calculated, the camera device 534 acquires a digital image of a real-world object within the real-world scene, wherein the real-world object corresponds to the virtual object. Moreover, during image acquisition the processor 502 receives user inputs in the form of manipulations 3D virtual view. For example, the user may use the touchscreen 522 to reposition, such as using rotate, translate, and/or zoom operations, such that the reference object is approximately aligned with the real-world reference object. After this approximate alignment the processor 502 does a programmatic adjustment of the 3D virtual view by means of fine modifications of the viewing rotation, translation, and/or zoom so as to substantially match the reference object points with the real world reference object points.

When the reference object is substantially aligned with the real-world reference object, the processor 502 determines the mismatch between the virtual object points and the corresponding points on the real-world object. Specifically, the processor 502 calculates an image-based positional difference between the points on the virtual object and the corresponding points on the real-world object. In an exemplary embodiment, the difference is calculated in pixels in each of the X and Y directions. The processor 502 calculates this image-based positional difference for each of the images acquired from different perspectives of the real-world scene.

The processor 502 then iterates on the location transform of the virtual object so as to minimize the combination of all the image positional differences. Specifically, the processor 502 uses standard non-linear regression that minimizes a cost function by adjusting a set of variable parameters. Based on the minimization step, the processor 502 adjusts the position and/or the orientation of the virtual object and adjusts the virtual model with respect to the corrected location of the virtual object.

Exemplary embodiments of computer systems, computer devices, computer-implemented methods, and computer-program products for use in location correction of a virtual model of a real-world scene are described above in detail. These embodiments are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer device, such as those having the computer architecture described herein, includes at least one processor or processing unit and a system memory. The computer device typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Moreover, embodiments of the invention may be embodied as a computer program product having one or more non-transitory computer-readable storage media having computer-executable components for use in location correction of a virtual model of a real-world scene. The components include a generation component that when executed by a processor causes the processor to generate the virtual model, including a virtual object. The generation component also causes the processor to receive a user selection of at least a portion of a plurality of identifiable points and calculate a location transform for the virtual object based on the plurality of identifiable points on the virtual object. Moreover, the generation component causes the processor to identify the virtual object and a corresponding reference object and to identify the at least one predefined point on the virtual object and a corresponding point on the reference object.

The components also include an acquisition component that when executed by a processor causes the processor to acquire at least one digital image of a real-world object within the real-world scene, wherein the real-world object corresponds to the virtual object. Furthermore, the components include a correction component that when executed by a processor causes the processor to calculate an image-based positional difference between at least one predefined point on the virtual object and at least one corresponding point on the real-world object, adjust the position and/or the orientation of the virtual object based on the image positional difference, and adjust the virtual model with respect to the corrected location of the virtual object. The correction component also causes the processor to do a programmatic adjustment of the 3D virtual view by means of fine modifications of the viewing rotation, translation, and/or zoom so as to substantially match the reference object points with the real world reference object points. The correction component then causes the processor to calculate the image-based positional difference between the at least one predefined point on the reference object and the at least one corresponding point on the real-world reference object. In some embodiments, the correction component causes the processor to iterate on the location transform of the virtual object so as to minimize the combination of all the image positional differences.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of well known computer systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for use in location correction of a virtual model of a real-world scene, said computer-implemented method comprising:
   by a processor coupled to a memory area storing the virtual model and a virtual object in the virtual model, the virtual model representing the real-world scene, said processor:
   generating the virtual model, including the virtual object;
   acquiring at least one digital image of a real-world object within the real-world scene, wherein the real-world object corresponds to the virtual object;
   calculating an image-based positional difference between at least one predefined point on the virtual object and at least one corresponding point on the real-world object;
   adjusting at least one of a position and an orientation of the virtual object based on the calculated image-based positional difference such that a corrected location of the virtual object with respect to the virtual model corresponds to a location of the real-world object in the real-world scene; and
   adjusting the virtual model with respect to the corrected location of the virtual object.

2. A computer-implemented method in accordance with claim 1, wherein generating the virtual model comprises calculating a location transform for the virtual object based on a plurality of identifiable points on the virtual object.

3. A computer-implemented method in accordance with claim 2, wherein calculating the location transform comprises receiving a user selection of at least a portion of the plurality of identifiable points.

4. A computer-implemented method in accordance with claim 1, wherein generating the virtual model comprises:
   identifying the virtual object and a corresponding reference object; and
   identifying the at least one predefined point on the virtual object and at least one corresponding point on the reference object.

5. A computer-implemented method in accordance with claim 4, further comprising a programmatic adjustment of a virtual view so as to substantially match the at least one corresponding point on the reference object with at least one corresponding point on a real-world reference object.

6. A computer-implemented method in accordance with claim 4, further comprising:
   programmatic adjustment of a virtual view; and
   calculating the image-based positional difference between the at least one predefined point on the virtual object and the at least one corresponding point on the real-world object for the acquired at least one digital image.

7. A computer-implemented method in accordance with claim 6, further comprising minimizing the image-based positional difference by iterating on a location transform that is used to generate the virtual model.

8. A computer for use in location correction of a virtual model of a real-world scene, said computer comprising:
   a memory area configured to store the virtual model and a virtual object in the virtual model, the virtual model representing the real-world scene; and
   a processor coupled to said memory area, said processor configured to:
   generate the virtual model, including the virtual object;
   acquire at least one digital image of a real-world object within the real-world scene, wherein the real-world object corresponds to the virtual object;
   calculate an image-based positional difference between at least one predefined point on the virtual object and at least one corresponding point on the real-world object;
   adjust at least one of a position and an orientation of the virtual object based on the calculated image-based positional difference such that a corrected location of the virtual object with respect to the virtual model corresponds to a location of the real-world object in the real-world scene; and
   adjust the virtual model with respect to the corrected location of the virtual object.

9. A computer in accordance with claim 8, wherein said processor is further configured to calculate a location transform for the virtual object based on a plurality of identifiable points on the virtual object.

10. A computer in accordance with claim 9, wherein said processor is further configured to receive a user selection of at least a portion of the plurality of identifiable points.

11. A computer in accordance with claim 8, wherein said processor is further configured to:

identify the virtual object and a corresponding reference object; and identify the at least one predefined point on the virtual object and at least one corresponding point on the reference object.

12. A computer in accordance with claim 11, wherein said processor is further configured to programmatically adjust a virtual view so as to substantially match the at least one corresponding point on the reference object with at least one corresponding point on a real-world reference object.

13. A computer in accordance with claim 11, wherein said processor is further configured to:

programmatically adjust a virtual view so as to substantially match the at least one corresponding point on the reference object with at least one corresponding point on a real-world reference object; and calculate the image-based positional difference between the at least one predefined point on the virtual object and the at least one corresponding point on the real-world object for the acquired at least one digital image.

14. A computer in accordance with claim 13, wherein said processor is further configured to minimize the image-based positional difference by iterating on a location transform used to generate the virtual model.

15. A computer program product comprising:

one or more non-transitory computer-readable storage media having computer-executable components for use in location correction of a virtual model of a real-world scene, said components comprising:

a generation component that when executed by a processor causes the processor to generate the virtual model, including a virtual object;

an acquisition component that when executed by a processor causes the processor to acquire at least one digital image of a real-world object within the real-world scene, wherein the real-world object corresponds to the virtual object; and a correction component that when executed by a processor causes the processor to:

calculate an image-based positional difference between at least one predefined point on the virtual object and at least one corresponding point on the real-world object;

adjust at least one of a position and an orientation of the virtual object based on the calculated image-based positional difference such that a corrected location of the virtual object with respect to the virtual model corresponds to a location of the real-world object in the real-world scene; and adjust the virtual model with respect to the corrected location of the virtual object.

16. A computer program product in accordance with claim 15, wherein said generation component further causes the processor to:

receive a user selection of at least a portion of a plurality of identifiable points on the virtual object; and calculate a location transform for the virtual object based on the plurality of identifiable points.

17. A computer program product in accordance with claim 15, wherein said generation component further causes the processor to:

identify the virtual object and a corresponding reference object; and identify the at least one predefined point on the virtual object and at least one corresponding point on the reference object.

18. A computer program product in accordance with claim 17, wherein said correction component further causes the processor to programmatically adjust a virtual view so as to substantially match the at least one corresponding point on the reference object with at least one corresponding point on a real-world reference object.

19. A computer program product in accordance with claim 17, wherein said correction component further causes the processor to:

programmatically adjust a virtual view; and calculate the image-based positional difference between the at least one corresponding point on the reference object and at least one corresponding point on a real-world reference object for the acquired at least one digital image.

20. A computer program product in accordance with claim 19, wherein said correction component further causes the processor to minimize the image-based positional difference by iterating on a location transform used by the generation component to generate the virtual model.

* * * * *